US012782854B2

(12) United States Patent
Tomiyori

(10) Patent No.: US 12,782,854 B2
(45) Date of Patent: Nov. 3, 2026

(54) IMAGE FORMING DEVICE

(71) Applicant: SHARP KABUSHIKI KAISHA, Sakai City (JP)

(72) Inventor: Minoru Tomiyori, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/243,551

(22) Filed: Jun. 19, 2025

(65) Prior Publication Data

US 2025/0390039 A1 Dec. 25, 2025

(30) Foreign Application Priority Data

Jun. 21, 2024 (JP) ................................. 2024-100396

(51) Int. Cl.
*G03G 15/20* (2006.01)
*G03G 21/16* (2006.01)

(52) U.S. Cl.
CPC ..... *G03G 15/2035* (2013.01); *G03G 15/2064* (2013.01); *G03G 21/1638* (2013.01); *G03G 21/1685* (2013.01); *G03G 2221/1639* (2013.01); *G03G 2221/169* (2013.01)

(58) Field of Classification Search
CPC ........... G03G 15/2035; G03G 15/2064; G03G 21/1638; G03G 21/1685; G03G 2221/1639; G03G 2221/169
See application file for complete search history.

(56) References Cited

U.S. PATENT DOCUMENTS 5,045,887 A * 9/1991 Nakamura ......... G03G 15/2035 399/122
2012/0057901 A1* 3/2012 Oba ................... G03G 15/2032 399/122
2012/0170957 A1* 7/2012 Lim ................... G03G 15/2064 399/331
2018/0348691 A1* 12/2018 Koyanagi ............ G03G 21/206
2019/0121264 A1* 4/2019 Yamada ............. G03G 21/1685
2019/0369549 A1* 12/2019 Kojima .............. G03G 15/5004
2020/0033764 A1* 1/2020 Kajiyama .......... G03G 15/2064
(Continued)

FOREIGN PATENT DOCUMENTS

JP 2000019927 A 1/2000

*Primary Examiner* — Sevan A Aydin
(74) *Attorney, Agent, or Firm* — ScienBiziP, P.C.

(57) ABSTRACT

An image forming device comprises a fixing device that switches between a pressing state and a pressure-released state of a pressing member with respect to a rotatable fixing member by means of a switching member; and a first access member that covers the fixing device when the first access member is in a closed state, and exposes the fixing device when the first access member is in an opened state, wherein the fixing device includes a second access member that covers a component in a fixing device body when the second access member is in a closed state, and covers the component when the second access member is in an opened state, when closed from the opened state, the first access member activates the switching member to set the pressing member to the pressing state from the pressure-released state, and when opened from the closed state, the second access member activates the switching member to set the pressing member to the pressure-released state from the pressing state.

8 Claims, 23 Drawing Sheets

(56) References Cited

U.S. PATENT DOCUMENTS

| | | | | |
|---|---|---|---|---|
| 2023/0082752 | A1* | 3/2023 | Toyota | G03G 15/2017 399/328 |
| 2024/0329574 | A1* | 10/2024 | Nguyen | G03G 15/2035 |
| 2025/0278045 | A1* | 9/2025 | Suzuki | G03G 15/2064 |

* cited by examiner

IMAGE FORMING DEVICE

CROSS-REFERENCE TO RELATED APPLICATION

The present application claims priority from Japanese Application JP2024-100396, the content to which is hereby incorporated by reference into this application.

BACKGROUND OF THE INVENTION

1. Field of the Invention

The present disclosure relates to an image forming device such as a copier, a multifunctional device, a printer and a facsimile machine device.

2. Description of the Related Art

In the related art, an image forming device is known that includes a fixing device that can switch between a pressing state and a pressure-released state of a pressing member with respect to a rotatable fixing member by means of a switching member (see, for example, JP2000-19927A).

Specifically, JP2000-19927A discloses an image forming device including an access member (exterior cover unit) that covers a fixing device when it is in a closed state and exposes the fixing device when it is in an opened state. In this image forming device, an opening closing operation of the access member activates a switching member (pressure release arm) to set the pressing member to the pressure-released state or the pressing state, and the switching from the pressure-released state to the pressing state and the switching from the pressing state to the pressure-released state are performed using one access member.

SUMMARY OF THE INVENTION

However, since the access member is engaged with the switching member to perform switching each time in the known image forming device, the configurations of the access member and the switching member for switching are complicated, and in turn, the configuration of the fixing device is complicated.

In view of this, an object of the present disclosure is to provide an image forming device that can easily perform the switching from the pressure-released state to the pressing state and the switching from the pressing state to the pressure-released state of the pressing member with respect to the fixing member without complicating the configuration of the fixing device.

The solve the above-described problems, an image forming device according to the present disclosure includes a fixing device that switches between a pressing state and a pressure-released state of a pressing member with respect to a rotatable fixing member by means of a switching member; and a first access member that covers the fixing device when the first access member is in a closed state, and exposes the fixing device when the first access member is in an opened state. The fixing device includes a second access member that covers a component in a fixing device body when the second access member is in a closed state, and covers the component when the second access member is in an opened state, when closed from the opened state, the first access member activates the switching member to set the pressing member to the pressing state from the pressure-released state, and when opened from the closed state, the second access member activates the switching member to set the pressing member to the pressure-released state from the pressing state.

According to the present disclosure, the switching from the pressure-released state to the pressing state and the switching from the pressing state to the pressure-released state of the pressing member with respect to the fixing member can be easily performed without complicating the configuration of the fixing device.

DETAILED DESCRIPTION OF THE INVENTION

Figure 1:
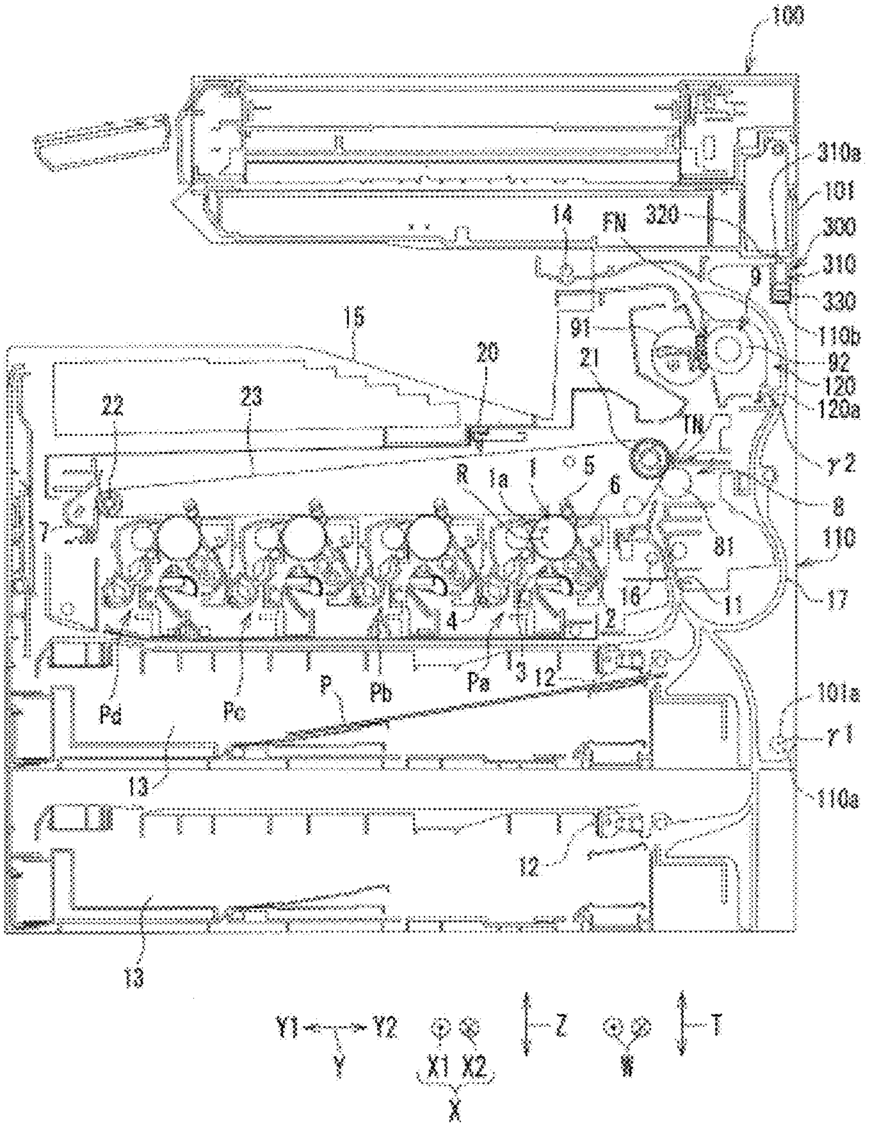
FIG. 1 is a sectional view illustrating an image forming device according to the present embodiment.

Hereinafter, embodiments according to the present disclosure will be described with reference to the drawings. In the following description, the same reference numerals are used for identical components. The same applies to the names and functions of those components. Accordingly, detailed descriptions thereof will not be repeated.

Image Forming Device

FIG. 1 is a sectional view illustrating an image forming device 100 according to the present embodiment. The following description will be given based on designations in the drawings in which the width direction is denoted as X, the right side as X1, the left side as X2, the direction orthogonal to the width direction X as the depth direction Y, the front surface side as Y1, the rear side as Y2, and the vertical direction orthogonal to both the width direction X and the depth direction Y as Z.

The image data used in an image forming device body 101 of the image forming device 100 corresponds to either a color image using each of the colors black (K), cyan (C), magenta (M), and yellow (Y), or a monochrome image using a single color (for example, black). In this manner, a photoconductor drum 1 (scanned member, image carrier), a charger 2, a print head 3, a development device 4, a primary transfer device 5 and a drum cleaning device 6 are each provided in four units to form four types toner images of respective colors. These components are respectively associated with black, cyan, magenta, and yellow, thereby forming four image stations Pa, Pb, Pc, and Pd. Note that, the image forming device 100 may be a monochrome image forming device.

At the image stations Pa, Pb, Pc and Pd, the chargers 2-2 uniformly charge, to a predetermined potential, surfaces 1*a* of the photoconductor drums 1-1 driven into rotation in a predetermined rotational direction R. The print heads 3-3 expose the surfaces 1*a* of the photoconductor drums 1-1 to form electrostatic latent images on the surfaces 1*a* of the photoconductor drums 1-1. The development devices 4 develop the electrostatic latent images on the surfaces 1*a* of the photoconductor drums 1-1 to form toner images on the surfaces 1*a* of the photoconductor drums 1-1. In this manner, color toner images are formed on the surfaces 1*a* of the photoconductor drums 1-1. The drum cleaning devices 6-6 remove and collect the remaining toners on the surfaces 1*a* of the photoconductor drums 1-1. The primary transfer devices 5-5 sequentially superimpose and transfer the color toner images on the surfaces 1*a* of the photoconductor drums 1-1 to an intermediate transfer belt 23 circulated by a driving roller 21 and a driven roller 22 of a belt drive device 20, thereby forming color toner images on the intermediate transfer belt 23. Belt cleaning device 7 removes and collects the remaining toner on the intermediate transfer belt 23.

A transfer nip portion TN is formed between the intermediate transfer belt 23 and a transfer roller 81 of a secondary transfer device 8. The transfer roller 81 of the secondary transfer device 8 conveys a sheet P such as recording paper or the like that has been conveyed through a sheet conveyance path 11 together with the intermediate transfer belt 23 by sandwiching the sheet P at the transfer nip portion TN, while transferring the color toner images on the surface of the intermediate transfer belt 23 onto the sheet P.

A fixing device 9 fixes the color toner image on the sheet P by applying heat and pressure with the sheet P sandwiched between a fixing member 91 (in this example, a fixing belt) and a pressing member 92 (in this example, a pressure roller).

The image forming device 100 conveys to the sheet conveyance path 11 the sheet P drawn from a sheet feeder 13 (sheet feeding cassette) by a pick-up roller 12, and conveys the sheet P toward an ejection roller 14 through the secondary transfer device 8 and the fixing device 9. The image forming device 100 ejects the sheet P conveyed to the ejection roller 14, to an ejection tray 15 by means of the ejection roller 14. A registration roller 16 and the like are disposed in the sheet conveyance path 11. The registration roller 16 temporarily stops the sheet P and aligns the front end of the sheet P, and then starts the conveyance of the sheet P in synchronization with the transfer timing for the toner image at the transfer nip portion TN between the intermediate transfer belt 23 and the transfer roller 81.

Note that, in FIG. 1, the sheet feeder 13 is provided in two stages, but this is not limitative, and the sheet feeder 13 may be provided in one stage, or three or more stages.

In addition, in a case where the image forming device 100 forms images not only on the front surface but also on the rear surface of the sheet P, the image forming device 100 conveys the sheet P in the reverse direction from the ejection roller 14 to a sheet inversion conveyance path 17. The image forming device 100 conveys, toward the sheet inversion conveyance path 17, the sheet P conveyed in the reverse direction, reverses the sheet P upside down by means of the sheet inversion conveyance path 17, and guides the sheet P to the registration roller 16 again. The image forming device 100 forms images on the rear surface of the sheet P guided to the registration roller 16 as on the front surface, and ejects it to the ejection tray 15.

Fixing Device

Figure 2:
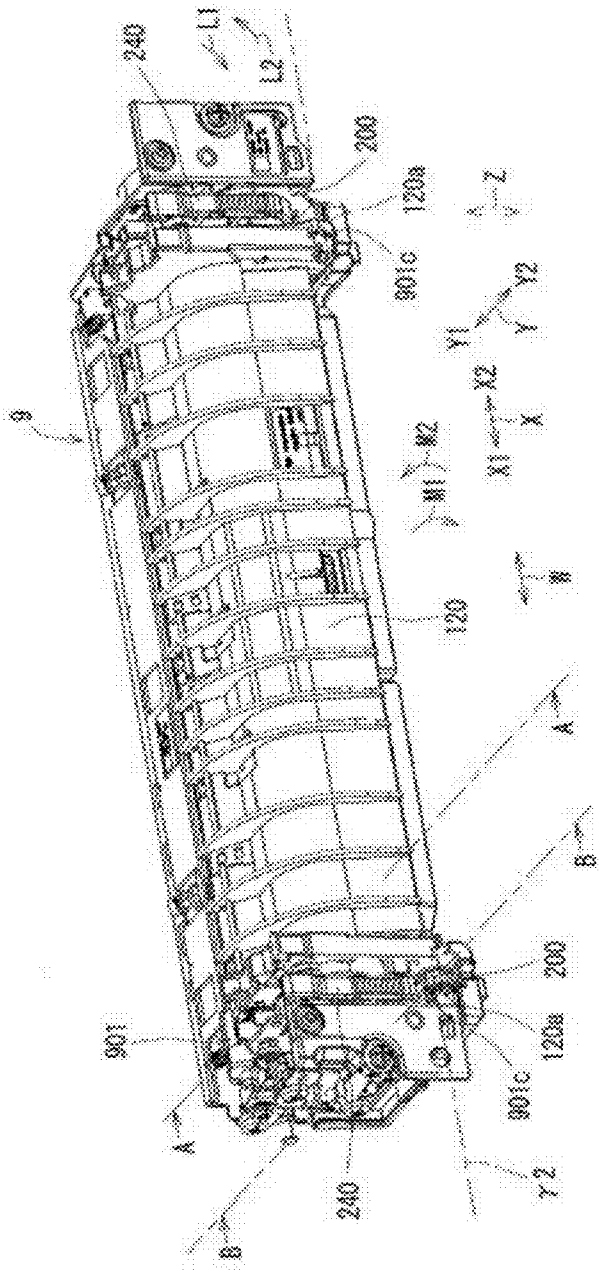
FIG. 2 is a perspective view of a fixing device in the image forming device illustrated in FIG. 1.
Figure 3:
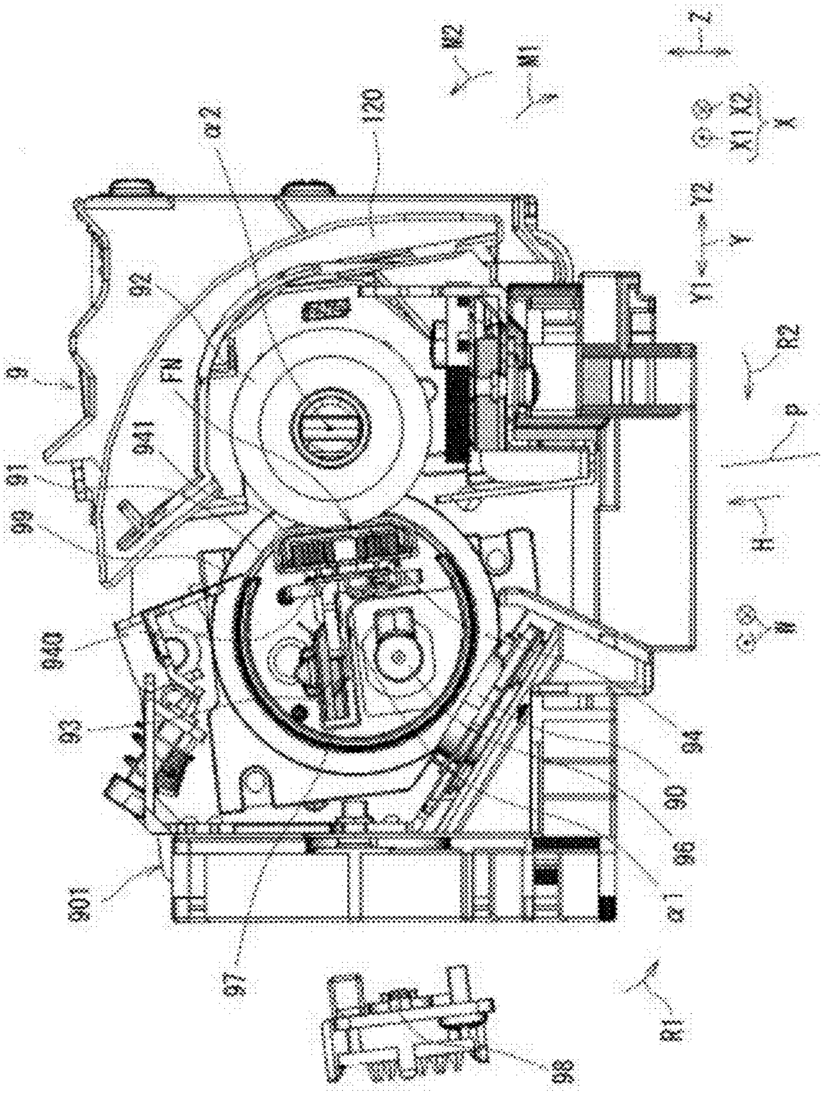
FIG. 3 is a sectional view of the fixing device illustrated in FIG. 2 taken along line A-A.
Figure 4:
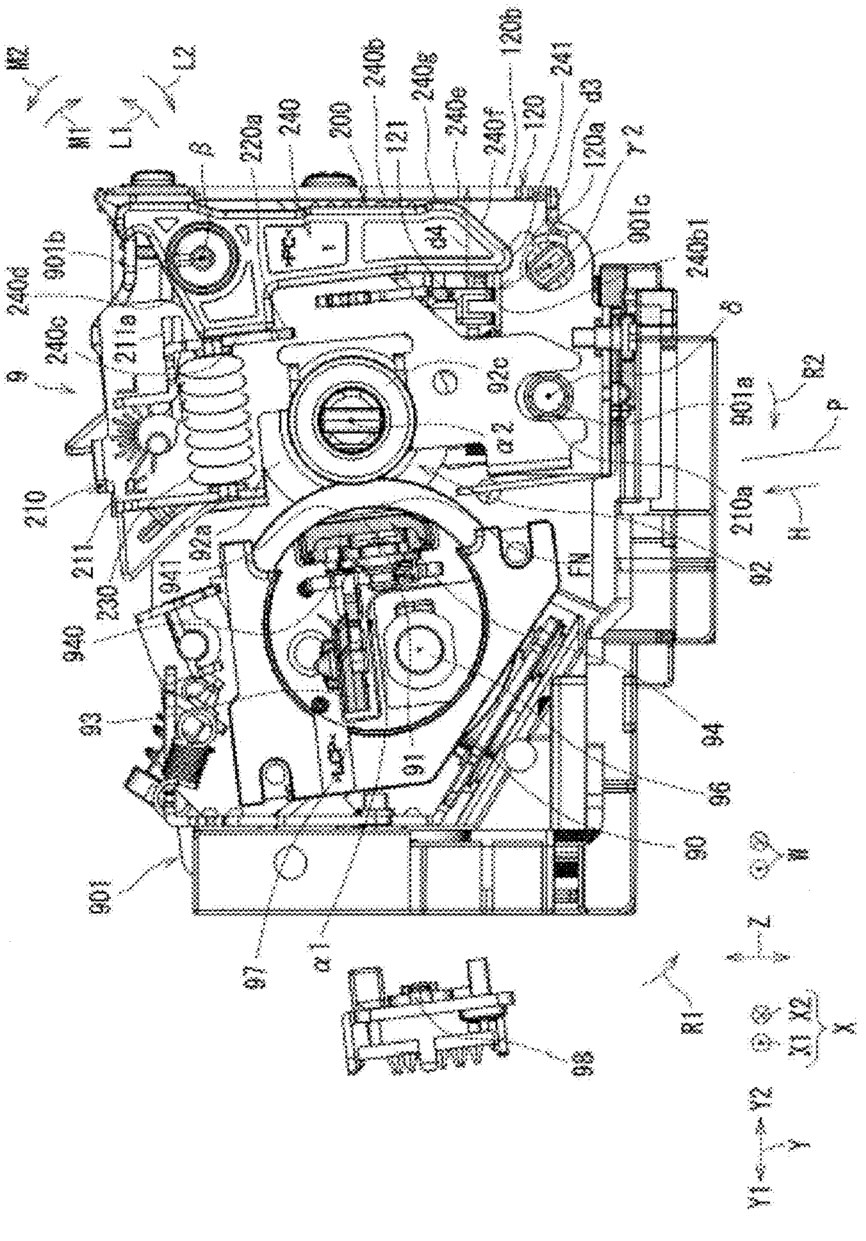
FIG. 4 is a sectional view of the fixing device illustrated in FIG. 2 taken along line B-B.

FIG. 2 is a perspective view of the fixing device 9 in the image forming device 100 illustrated in FIG. 1. FIGS. 3 and 4 are sectional views of the fixing device 9 illustrated in FIG. 2 taken along the line A-A and line B-B, respectively.

The fixing device 9 further includes a supporting member 93, a fixing pad 94, a heat source 96, a reflection member 97 (in this example, a reflection plate), a temperature detector 98 (in this example, a thermopile), a separation plate 99 (see FIG. 3) and a thermostat 90. The supporting member 93, the fixing pad 94, the heat source 96 and the reflection member 97 are provided inside a fixing belt (91).

The fixing belt (91) is an endless flexible belt. The fixing belt (91) is rotatable around a rotation axis $\alpha$1 extending along an orthogonal direction (width direction X) orthogonal to a conveyance direction H of the sheet P.

The fixing pad 94 is composed of resin, and is formed in a long plate shape extending in a rotation axis direction W of the fixing belt (91), for example. The fixing pad 94 includes a fixing pad body 940, and a slide movement sheet 941 provided on the surface of the fixing pad body 940 on the side that makes sliding contact with the fixing belt (91).

The supporting member 93 supports the fixing pad 94. The supporting member 93 is fixed to a fixing device body 901 (main body frame) at both end portions in the rotation axis direction W. The reflection member 97 is provided on at least the surface of the supporting member 93 on the heat source 96 side.

The heat source 96 is a member for heating the fixing belt (91), and extends in the rotation axis direction W of the fixing belt (91). The heat source 96 may be a lamp heater such as a halogen lamp, for example.

A pressure roller (92) is disposed at a position facing the fixing pad 94 with the fixing belt (91) sandwiched therebetween. The pressure roller (92) rotates around a rotation axis $\alpha 2$ that is parallel to the rotation axis $\alpha 1$ of the fixing belt (91), and extends parallel to the fixing belt (91). The pressure roller (92) presses the fixing belt (91) toward the fixing pad 94, and forms a fixing nip portion FN between the pressure roller (92) and the fixing belt (91).

The driving force from a driving source (not illustrated) such as a motor is transmitted to the pressure roller (92) through a drive transmission mechanism (not illustrated) such as a gear. The pressure roller (92) is driven into rotation with a driving force from the driving source. The fixing belt (91) rotates to follow the rotation of the pressure roller (92) in a first rotational direction R1 that is opposite to a second rotational direction R2 of the pressure roller (92) direction.

Present Embodiment

The image forming device 100 includes a first access member 110 (in this example, a rear access door) (see FIG. 1), and the fixing device 9 includes a second access member 120 (in this example, a conveyance paper guide).

Figure 5:
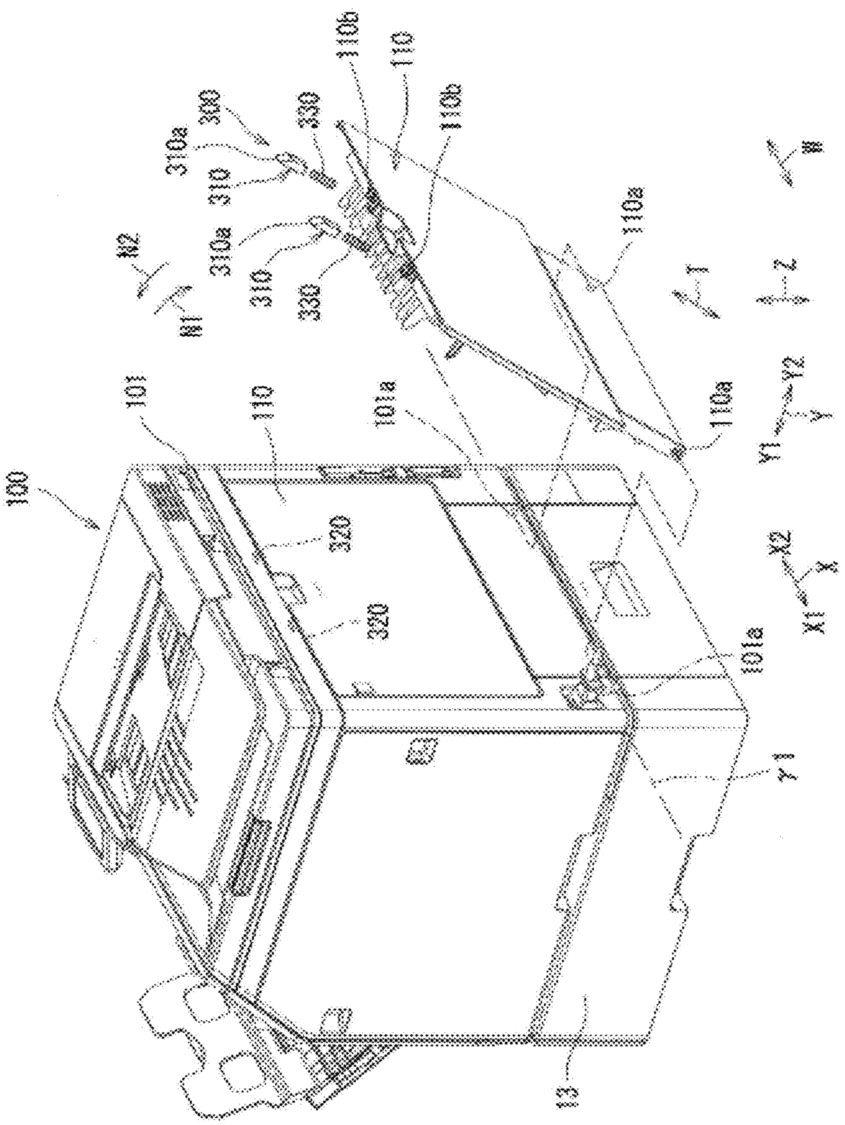
FIG. 5 is a perspective view illustrating a closed state of a first access member in the image forming device illustrated in FIG. 1 together with the first access member in an open state.
Figure 6:
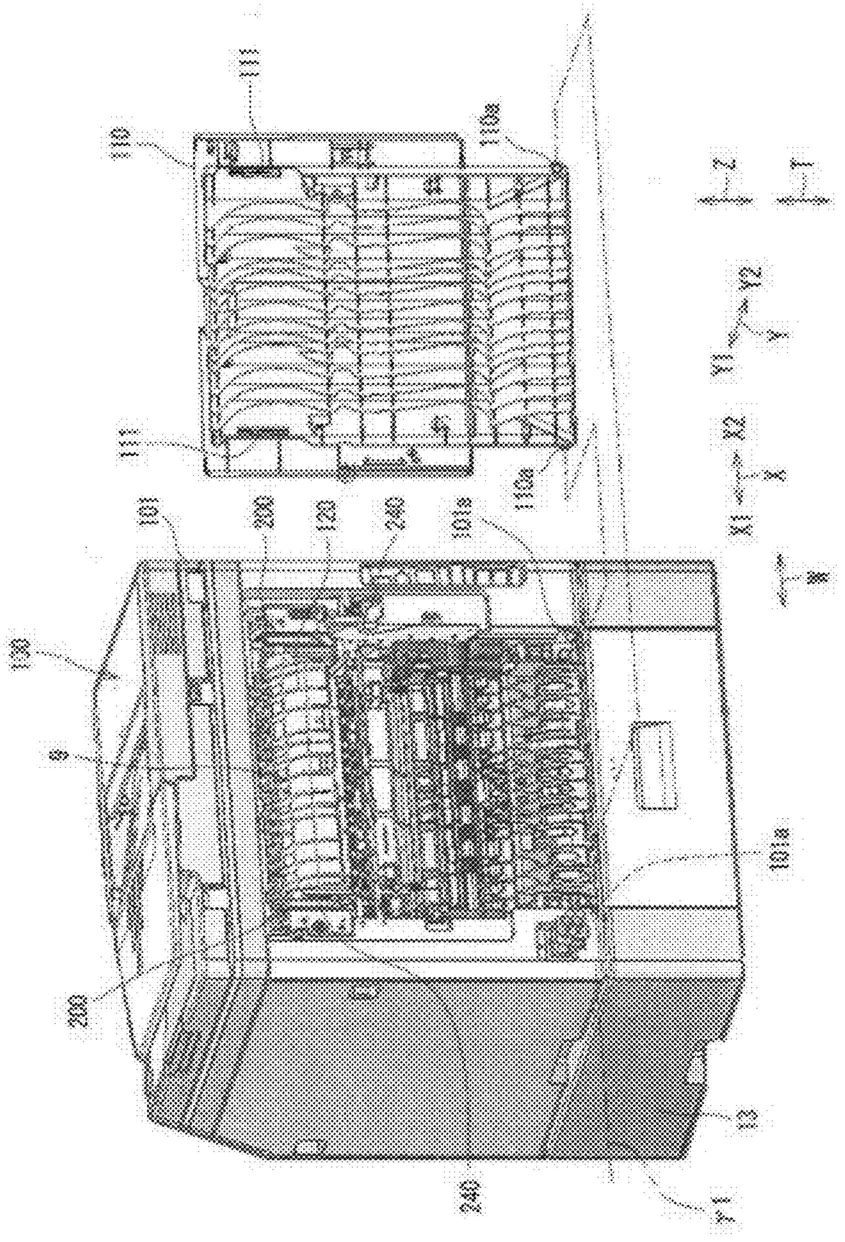
FIG. 6 is a perspective view illustrating a state where the first access member is detached from the image forming device illustrated in FIG. 1.

FIG. 5 is a perspective view illustrating a closed state of the first access member 110 in the image forming device 100 illustrated in FIG. 1 together with the first access member 110 in an opened state. FIG. 6 is a perspective view illustrating a state where the first access member 110 is detached from the image forming device 100 illustrated in FIG. 1.

Figure 7:
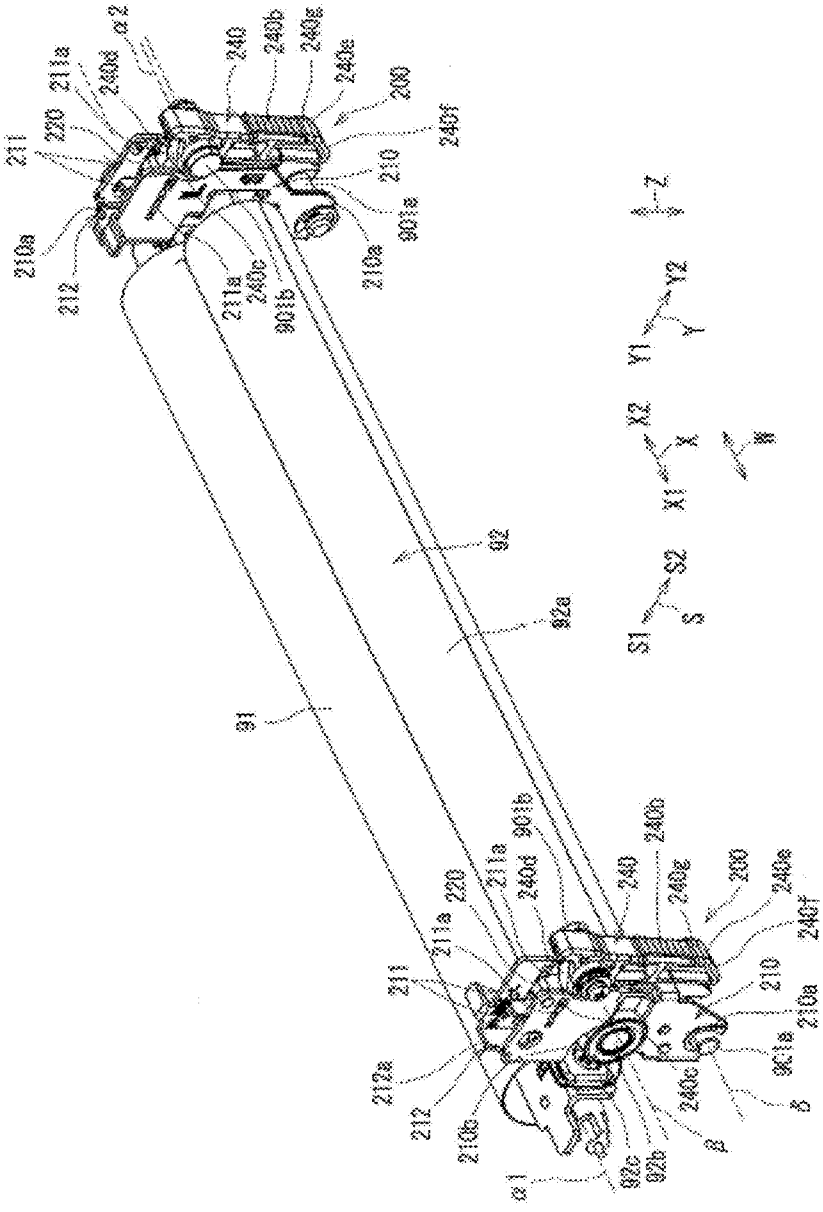
FIG. 7 is a perspective view illustrating a switching mechanism in the fixing device illustrated in FIG. 1.
Figure 8:
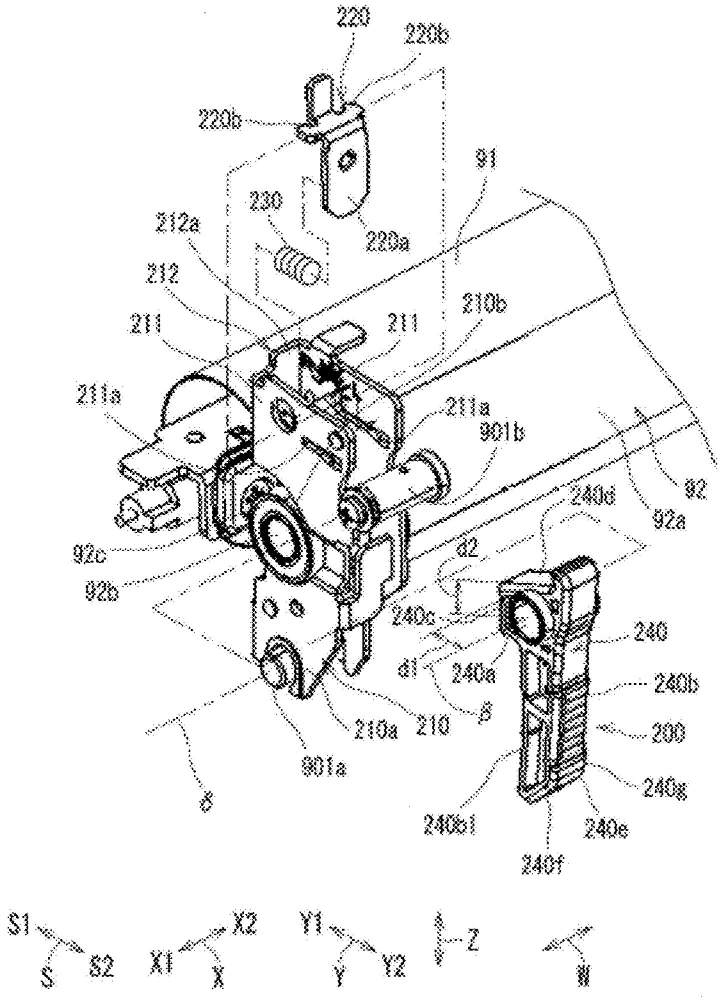
FIG. 8 is an exploded perspective view illustrating the switching mechanism on the right side in the fixing device illustrated in FIG. 1.
Figure 9:
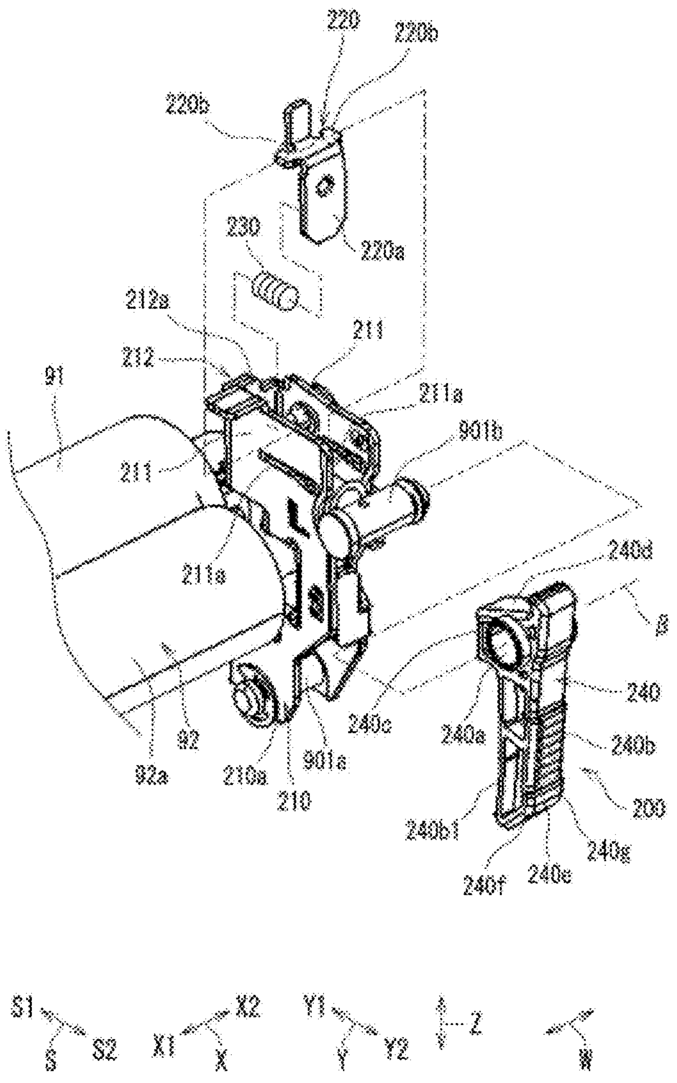
FIG. 9 is an exploded perspective view illustrating the switching mechanism on the left side in the fixing device illustrated in FIG. 1.

FIG. 7 is a perspective view illustrating a switching mechanism 200 in the fixing device 9 illustrated in FIG. 1. FIGS. 8 and 9 are exploded perspective views illustrating the switching mechanisms 200 on the right side and left side in the fixing device 9 illustrated in FIG. 1, respectively.

Figure 10:
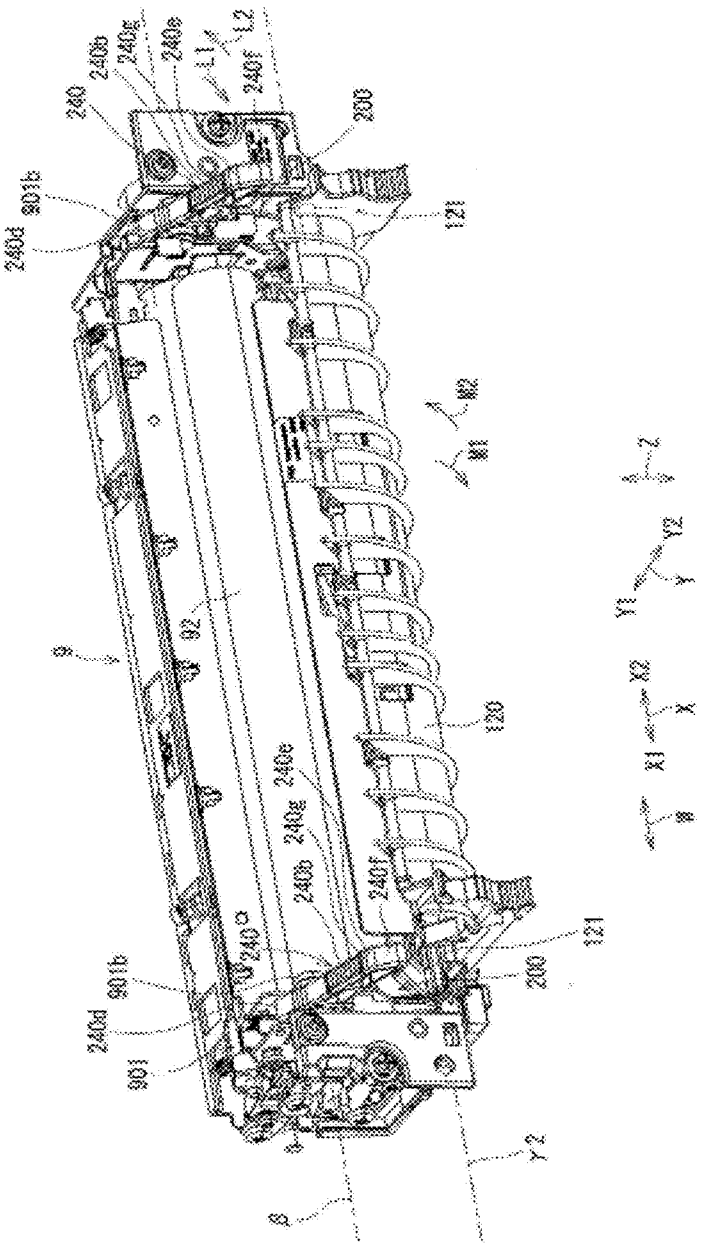
FIG. 10 is a perspective view illustrating a state where a second access member is opened and the pressing member is in a pressure-released state by the action of the switching member in the fixing device illustrated in FIG. 1.
Figure 11:
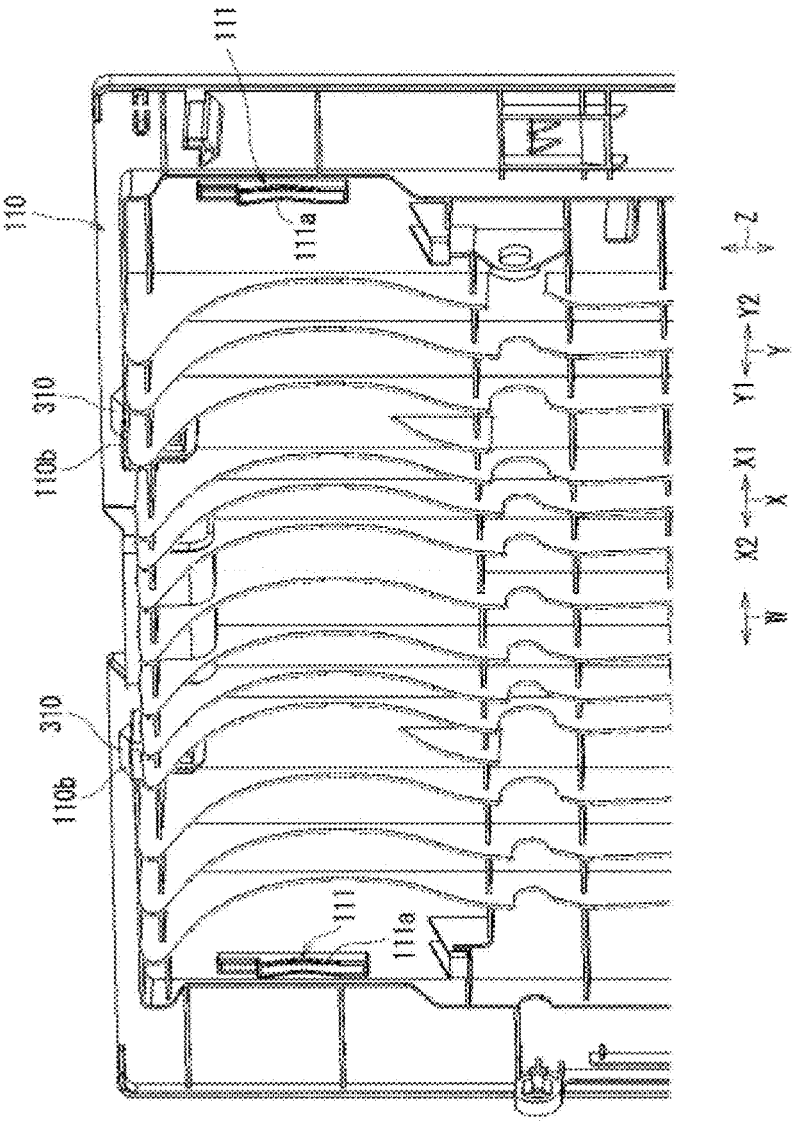
FIG. 11 is an enlarged perspective view illustrating a sliding contact portion in the first access member illustrated in FIG. 6.
Figure 12:
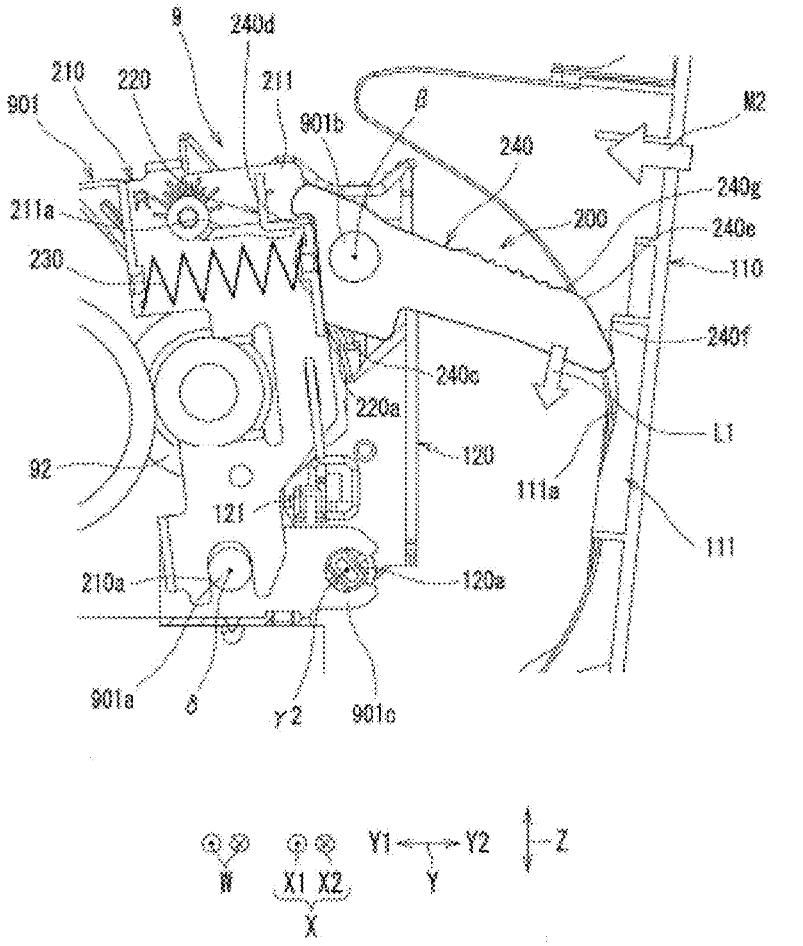
FIG. 12 is a sectional view illustrating a first closing process of closing the first access member.

FIG. 10 is a perspective view illustrating a state where the second access member 120 is opened in the fixing device 9 illustrated in FIG. 1 and the pressing member 92 is set to a pressure-released state by the action of a switching member 240 (240, 240). In addition, FIG. 11 is an enlarged perspective view illustrating a sliding contact portion 111 (111, 111) in the first access member 110 illustrated in FIG. 6.

Switching Mechanism

The fixing device 9 includes the switching mechanism 200 that can switch between the pressing state and the pressure-released state of the pressing member 92 on the rotatable fixing member 91 by means of the switching member 240 (240, 240). In this example, the switching mechanism 200 is a pair of the switching mechanisms 200, 200 provided at both end portions in the rotation axis direction W. The pair of the switching mechanisms 200, 200 each includes a supporting member 210, a pressing member 220, a biasing member 230 (in this example, a coil spring), and the switching member 240. Specifically, the supporting member 210 is a pair of the supporting members 210, 210, the pressing member 220 is a pair of the pressing members 220, 220, the biasing member 230 is a pair of the biasing members 230, 230, and the switching member 240 is a pair of the switching members 240, 240.

The supporting members 210, 210 freely support the pressing member 92 so as to be movable toward and away from the fixing member 91. Specifically, the supporting members 210, 210 rotatably support the pressing member 92 around the rotation axis $\alpha 2$ (see FIG. 3), and sway it about a sway axis $\delta$ (see FIGS. 4, 7, and 8) along the rotation axis direction W with respect to the fixing device body 901. In this example, sway shafts 901*a*, 901*a* extending along the rotation axis direction W are fixed at both end portions of the fixing device body 901 in the rotation axis direction W.

The supporting members 210, 210 are provided with engagers 210*a*, 210*a* (engagement recesses) that engage with the sway shafts 901*a*, 901*a* of the fixing device body 901, and recesses 210*b*, 210*b* that receive rotation shafts 92*b*, 92*b* of the pressure roller (92). The pressure roller (92) is composed of a roller 92*a* that fixes a toner image to the sheet P, and the rotation shafts 92*b*, 92*b* provided at both end portions of the roller 92*a* in the rotation axis direction W. In the pressure roller (92), the rotation shafts 92*b*, 92*b* are supported at the recesses 210*b*, 210*b* of the supporting members 210, 210 through bearing members 92*c*, 92*c* (bearings). In this manner, the supporting members 210, 210 can support the pressing member 92 so as to be rotatable around the rotation axis $\alpha 2$ and so as to be movable toward and away from the fixing member 91 about the sway axis $\delta$.

The pressing members 220, 220 are movably supported in an approach/separation direction S (in this example, depth direction Y) of the pressing member 92 with respect to the supporting members 210, 210, and are biased by the biasing members 230, 230 to a separation direction S2 in the approach/separation direction S. Specifically, the supporting members 210, 210 include a pair of side plates 211, 211, and a coupling plate 212 that couples the pair of side plates 211, 211. The pair of side plates 211, 211 and the coupling plate 212 are integrally formed. Slits 211*a*, 211*a* extending along the approach/separation direction S are provided on the side opposite to the engager 210*a* with the recesses 210*b*, 210*b* of the pair of side plates 211, 211 therebetween in the radial direction of the sway axis $\delta$.

The pressing members 220, 220 are provided with a pressing surface 220*a* that presses the coupling plate 212 of the supporting members 210, 210 through the biasing members 230, 230, and a pair of protruding parts 220*b*, 220*b* that are inserted to the slits 211*a*, 211*a*, respectively. In this manner, the supporting members 210, 210 can movably (slidably) support the pressing members 220, 220 in the approach/separation direction S with the pressing members 220, 220 biased to the separation direction S2 by means of the biasing members 230, 230.

The coupling plate 212 includes a contacted surface 212*a* that faces the pressing surface 220*a* in the pressing members 220, 220 and is orthogonal to the approach/separation direction S. The biasing members 230, 230 are disposed between the contacted surfaces 212*a*, 212*a* of the coupling plates 212, 212 and the pressing surfaces 220*a*, 220*a* of the pressing members 220, 220.

The switching members 240, 240 are provided with an engager 240*a* (engagement hole) (see FIG. 8), a lever 240*b*, a first contacted surface 240*c*, and a second contacted surface 240*d*.

Switching turning shafts 901*b*, 901*b* extending along the rotation axis direction W are fixed at both end portions of the fixing device body 901 in the rotation axis direction W. The engagers 240*a*, 240*a* of the switching members 240, 240 are inserted to the switching turning shafts 901*b*, 901*b* of the fixing device body 901, respectively. In this manner, the switching members 240, 240 can turn about a switching turning axis $\beta$ (see FIGS. 4 to 7) extending along the rotation axis $\alpha 1$ of the fixing member 91.

The lever 240*b* is grabbed by the operator. The first contacted surface 240*c* and the second contacted surface 240*d* are surfaces extending along both the longitudinal direction of the lever 240*b* and the rotation axis direction W, and are continuously connected such that the angle between the first contacted surface 240*c* and the second contacted surface 240*d* is an obtuse angle. A distance d1 (see FIG. 8) between the first contacted surface 240*c* and the switching turning axis β is greater than a distance d2 (see FIG. 8) between the second contacted surface 240*d* and the switching turning axis β (d1>d2).

In the switching members 240, 240, when the operator turns the lever 240*b* of the switching members 240, 240 in the direction that intersects the approach/separation direction S, the first contacted surface 240*c* makes contact with the pressing surface 220*a* in the pressing member 220. At this time, the switching members 240, 240 go beyond the top dead center (the corner portion between the first contacted surface 240*c* and the second contacted surface 240*d*) in the process of movement from the second contacted surface 240*d* to the first contacted surface 240*c*, and the contact of the first contacted surface 240*c* with the pressing surface 220*a* is maintained. Then, pressing of the first contacted surface 240*c* in the switching members 240, 240 against the pressing surface 220*a* in the pressing members 220, 220 presses the coupling plate 212 in the supporting members 210, 210 to an approach side S1 in the approach/separation direction S against the biasing force of the biasing members 230, 230. In this manner, the pressing member 92 can be set to the pressing state with respect to the fixing member 91.

In addition, in the switching members 240, 240, when the operator turns the lever 240*b* of the switching members 240, 240 in the approach/separation direction S, the second contacted surface 240*d* makes contact with the pressing surface 220*a* in the pressing member 220. At this time, the switching members 240, 240 go beyond the top dead center (the corner portion between the first contacted surface 240*c* and the second contacted surface 240*d*) in the process of movement from the first contacted surface 240*c* to the second contacted surface 240*d*, and the contact of the second contacted surface 240*d* with the pressing surface 220*a* is maintained. Then, when the pressing of the second contacted surface 240*d* in the switching members 240, 240 against the pressing surface 220*a* in the pressing members 220, 220 is released, the pressing to the coupling plate 212 in the supporting members 210, 210 through the biasing members 230, 230 is released. In this manner, the pressing member 92 can be set to the pressure-released state with respect to the fixing member 91.

Present Embodiment

In the present embodiment, as described above, the fixing device 9 can switch between the pressing state and the pressure-released state of the pressing member 92 (in this example, the pressure roller) with respect to the rotatable fixing member 91 (in this example, fixing belt) by means of the switching member 240.

The first access member 110 (see FIGS. 1, 5, and 6) in the closed state covers the fixing device 9, and the first access member 110 in the opened state exposes all or part of the fixing device 9. The second access member 120 in the closed state covers the component (in this example, the pressing member 92) in the fixing device body 901, and the second access member 120 in the opened state exposes all or part of the component (92).

Here, "rotation" refers to the movement of the target member by 360 degrees or more, whereas "turning" refers to the movement of the target member by less than 360 degrees.

As illustrated in FIGS. 1, 5, and 6, the first access member 110 can turn about a first turning axis γ1 extending along the rotation axis direction W. As illustrated in FIGS. 5 and 6, the first access member 110 is turnably provided about the first turning axis γ1 with respect to the image forming device body 101.

Specifically, a pair of engagers 101*a*, 101*a* (engagement holes) are provided in a lower portion in the image forming device body 101 at the inner side surfaces in the rotation axis direction W on the upper side of the sheet feeder 13. A pair of turning support shafts 110*a*, 110*a* extending outward along the rotation axis direction W are provided at the outer side surfaces in the rotation axis direction W at the lower end portion of the first access member 110. In the first access member 110, the turning support shafts 110*a*, 110*a* respectively engage with the engagers 101*a*, 101*a* in the image forming device body 101. In this manner, the first access member 110 turns about the first turning axis γ1, and can open and close with respect to the image forming device body 101.

The image forming device body 101 is provided with a lock mechanism 300 (see FIGS. 1 to 5) that locks the first access member 110 to the fixing device body 901 in a releasable manner.

The lock mechanism 300 includes one or more (in this example, two) engaging portions 310, 310 (in this example, protrusions) provided in the first access member 110, one or more (in this example, two) locking portions 320, 320 (in this example, recesses) provided in the image forming device body 101 and locks the engaging portions 310, 310, and biasing members 330, 330 (coil spring).

The first access member 110 is provided with storage chambers 110*b*, 110*b* for accommodating the engaging portions 310, 310, and the biasing members 330, 330. In the storage chambers 110*b*, 110*b*, the engaging portions 310, 310 are provided so as to be movable in an approach/separation direction T (the radial direction with the first turning axis γ1 at the center) in which they move toward and away from the locking portions 320, 320. The engaging portions 310, 310 have pointed tip end portions 310*a*. The biasing members 330, 330 are disposed between the bottom surfaces of the storage chambers 110*b*, 110*b* and the engaging portions 310, 310, and bias the engaging portions 310, 310 to the side opposite to the first turning axis γ1 in the approach/separation direction T. Note that, the first access member 110 is provided with a removal preventing part (omitted in the drawing) for preventing removal of the engaging portions 310, 310 to the locking portions 320, 320 side. In this manner, the engaging portions 310, 310 can be movable in the approach/separation direction T in the state where the engaging portions 310, 310 are biased to the locking portions 320, 320 side with respect to the first access member 110 by means of the biasing members 330, 330. The locking portions 320, 320 are recesses provided in the image forming device body 101.

In addition, as illustrated in FIGS. 2 and 4, the second access member 120 can be opened and closed about a second turning axis γ2 extending along the rotation axis α1 of the fixing member 91. The second access member 120 is provided in an openable manner about the second turning axis γ2 with respect to the fixing device body 901. Specifically, a pair of engagers 901*c*, 901*c* (engagement recesses) is provided at both end portions in the rotation axis direction W at a lower portion on the first access member 110 side in the fixing device body 901. A pair of turning support shafts 120*a*, 120*a* is provided at the lower end portion of the second access member 120, and both end portions in the rotation axis direction W. In the second access member 120, the turning support shafts 120*a*, 120*a* respectively engage with engagers 901*c*, 901*c* in the fixing device body 901. In this manner, the second access member 120 can open and close with respect to the fixing device body 901 by turning about the second turning axis $\gamma 2$ with respect to the fixing device body 901.

The first access member 110 is provided with the sliding contact portions 111, 111 (an example of the first activator) (FIGS. 6 and 11) that activate the switching members 240, 240 by making sliding contact with the switching members 240, 240 when the first access member 110 is being closed. In addition, the second access member 120 is provided with the contact parts 121, 121 (an example of the second activator) (FIG. 4) that activate the switching members 240, 240 by making contact with the switching members 240, 240 when the second access member 120 is being opened.

Figure 17:
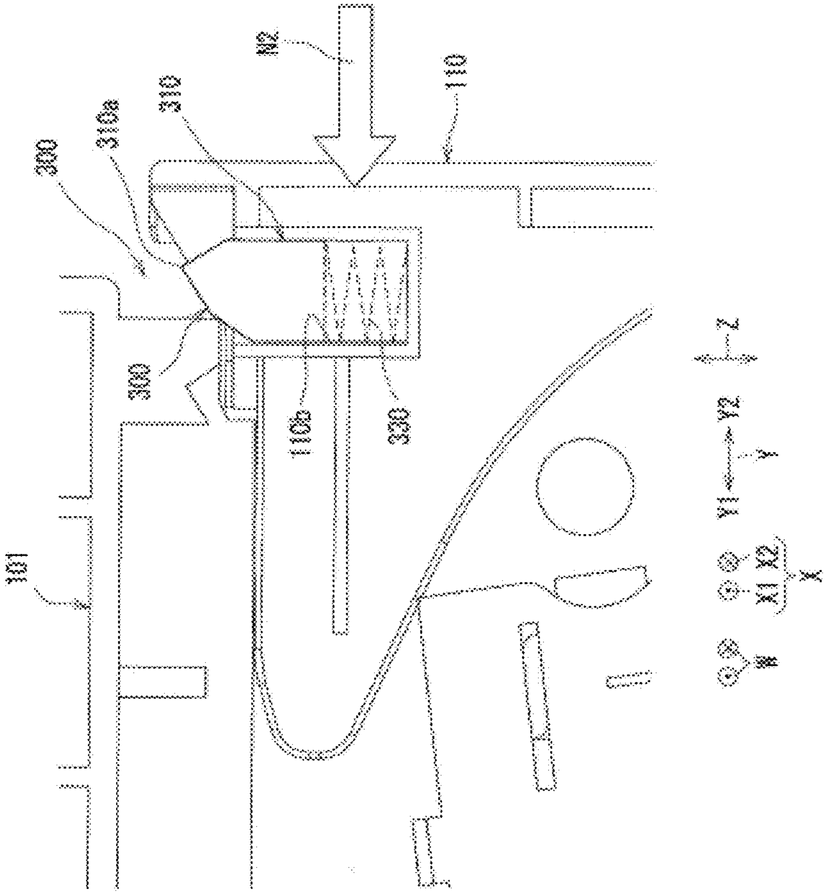
FIG. 17 is a sectional view illustrating an unlocked state of a lock mechanism.
Figure 18:
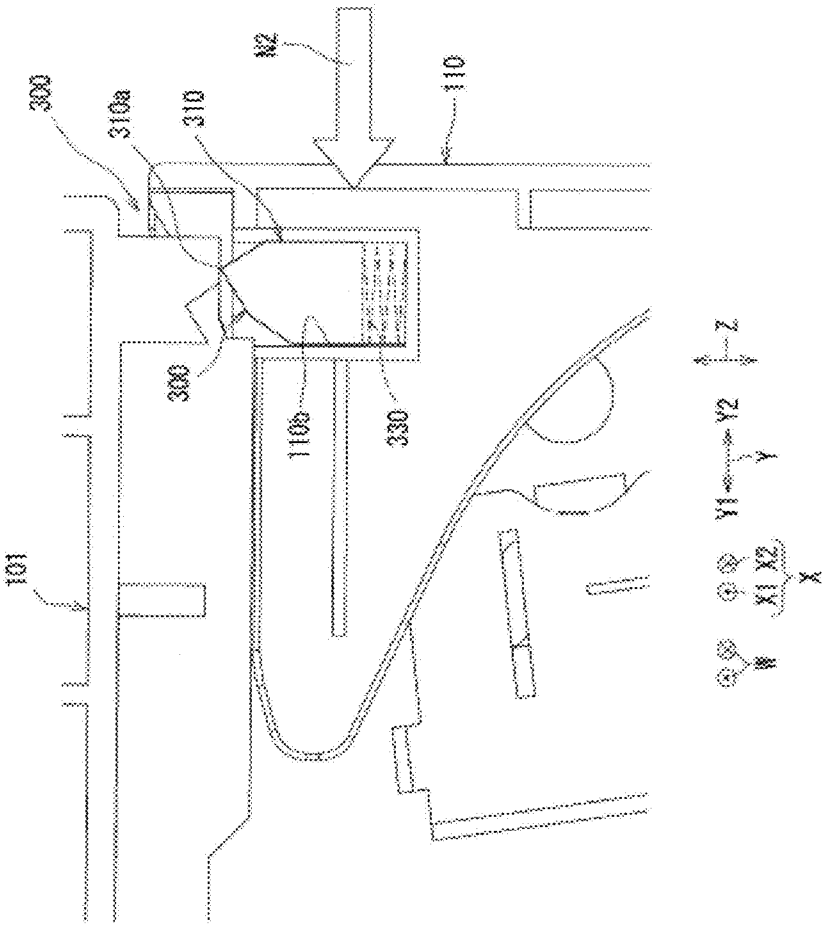
FIG. 18 is a sectional view illustrating a locked state of the lock mechanism.
Figure 19:
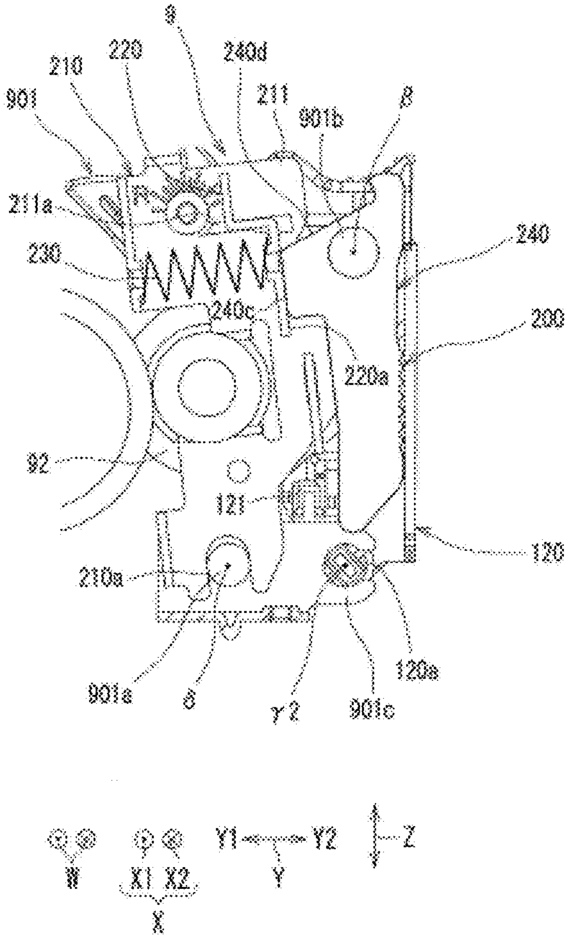
FIG. 19 is a sectional view illustrating a first opening process of opening the second access member.
Figure 20:
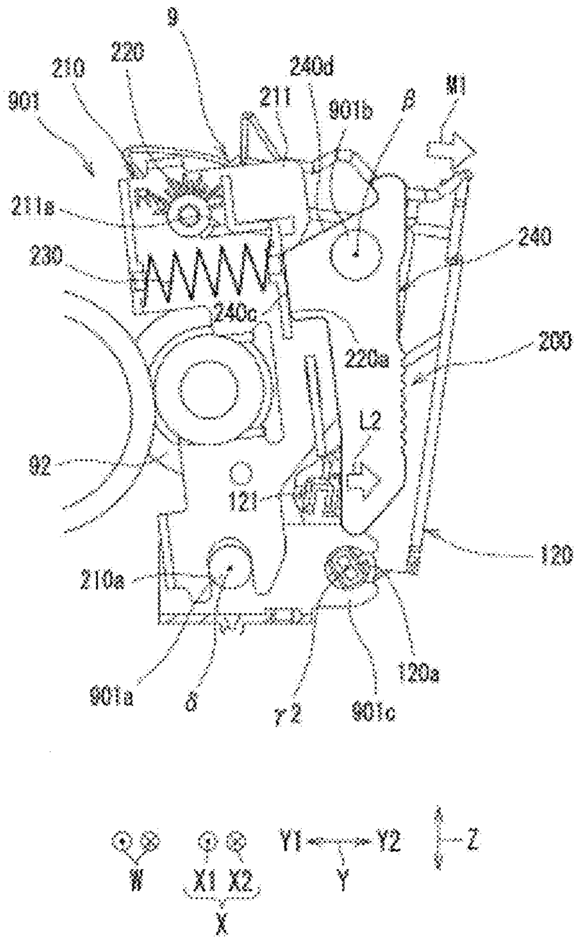
FIG. 20 is a sectional view illustrating a second opening process of opening the second access member.

FIGS. 12 to 16 are sectional views illustrating a first closing process to a fifth closing process of closing the first access member 110, respectively. FIGS. 17 and 18 are sectional views illustrating an unlocked state and a lock state of the lock mechanism 300, respectively. In addition, FIGS. 19 to 23 are sectional views illustrating a first to fifth opening processes of opening the second access member 120, respectively.

Figure 13:
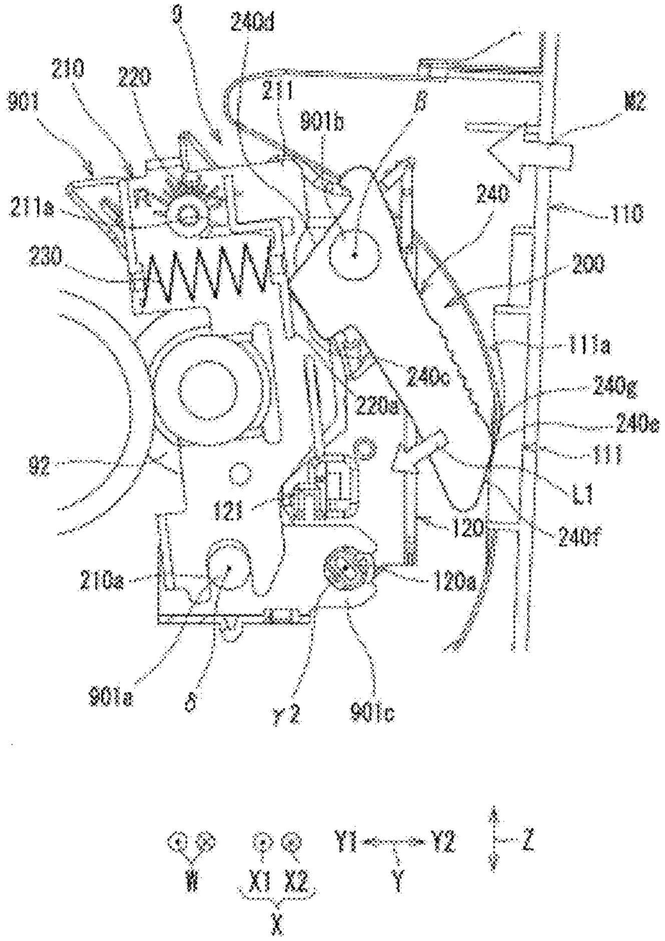
FIG. 13 is a sectional view illustrating a second closing process of closing the first access member.
Figure 14:
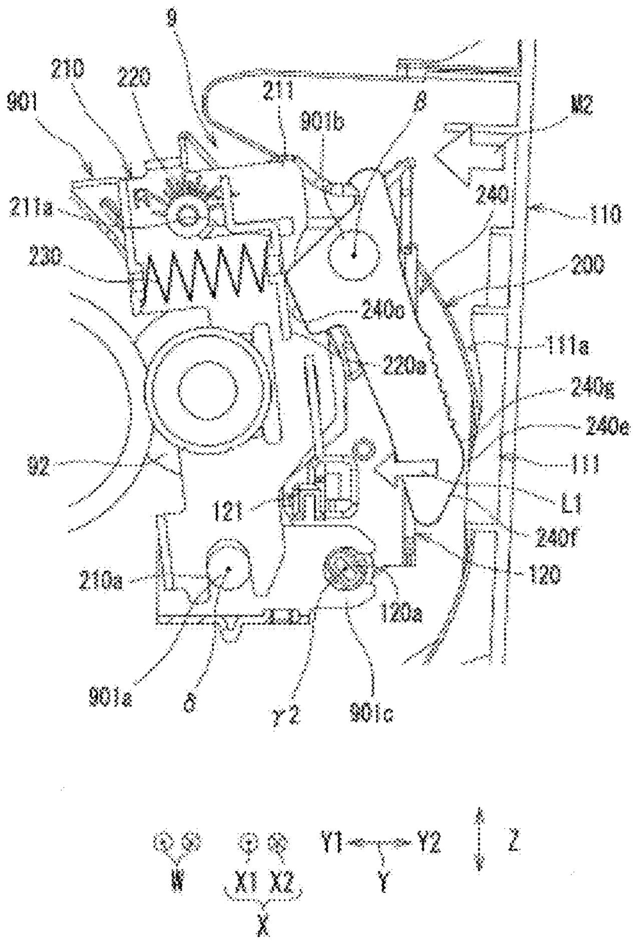
FIG. 14 is a sectional view illustrating a third closing process of closing the first access member.
Figure 15:
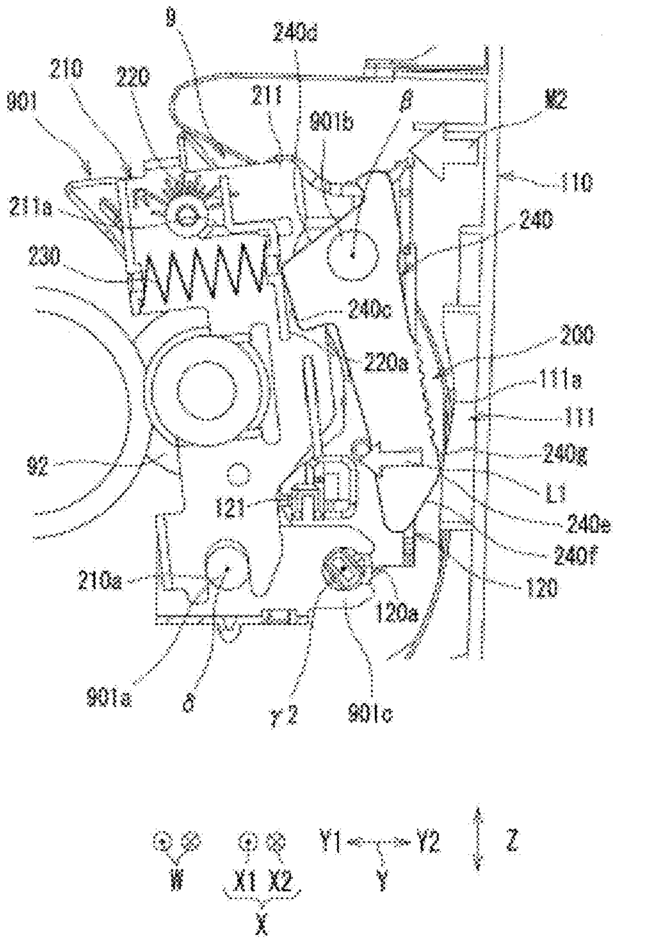
FIG. 15 is a sectional view illustrating a fourth closing process of closing the first access member.

In the present embodiment, when the first access member 110 is turned in a closing direction M2 from the opened state in an opening direction M1 (see FIG. 12) when the second access member 120 is closed in a closing direction N2, the sliding contact portions 111, 111 in the first access member 110 make sliding contact with the switching members 240, 240, thereby activating the switching members 240, 240 (see FIGS. 13 and 14). At this time, the switching members 240, 240 turn from the pressing release side to the pressing side of the pressing member 92 (in the drawing, the arrow L1 direction), the second contacted surface 240*d* in contact with the pressing surface 220*a* of the pressing member 220 separates from the pressing surface 220*a*, and the first contacted surface 240*c* approaches the pressing surface 220*a*. The first access member 110 the engaging portions 310, 310 of the lock mechanism 300 approach the locking portions 320, 320 of the lock mechanism 300 provided in the image forming device body 101 (see FIG. 17).

Figure 16:
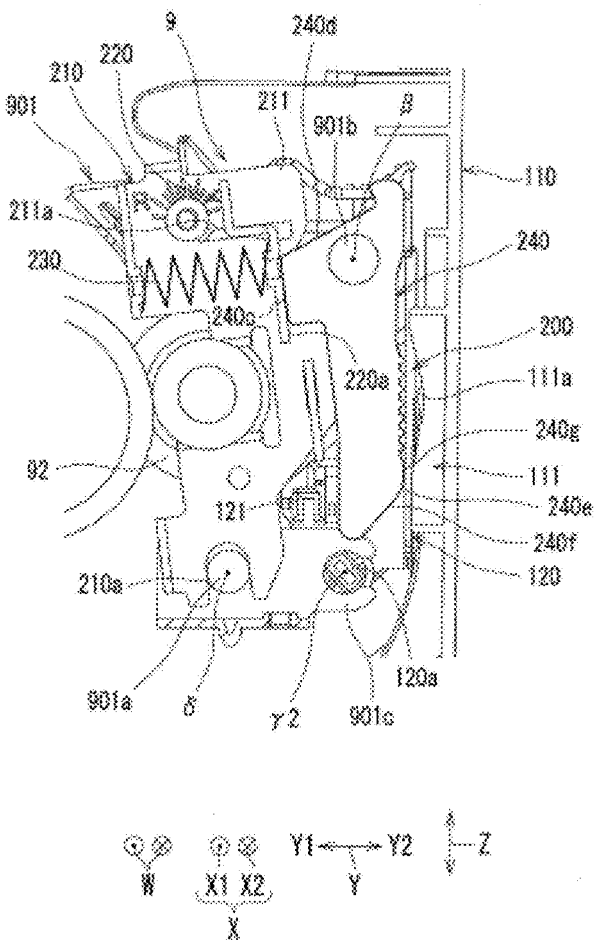
FIG. 16 is a sectional view illustrating a fifth closing process of closing the first access member.

When the first access member 110 is further turned in the closing direction M2, the switching members 240, 240 go beyond the top dead center in the process of movement from the second contacted surface 240*d* to the first contacted surface 240*c* (see FIGS. 13 and 14), the first contacted surface 240*c* makes contact with the pressing surface 220*a* of the pressing member 220 (see FIG. 15), and the contact of the first contacted surface 240*c* with the pressing surface 220*a* is maintained (see FIG. 16). The first access member 110 is locked, with the engaging portions 310, 310 of the lock mechanism 300 locked to the locking portions 320, 320 of the lock mechanism 300 provided in the image forming device body 101 (see FIG. 18).

In this manner, the image forming device 100 can set the pressing member 92 from the pressure-released state to the pressing state by means of the switching members 240, 240 through the closing operation of the first access member 110 by the operator.

On the other hand, when the locking state of the engaging portions 310, 310 of the lock mechanism 300 with respect to the locking portions 320, 320 of the lock mechanism 300 provided in the image forming device body 101 is released (see FIG. 17), the first access member 110 turns in the opening direction M1.

Figure 21:
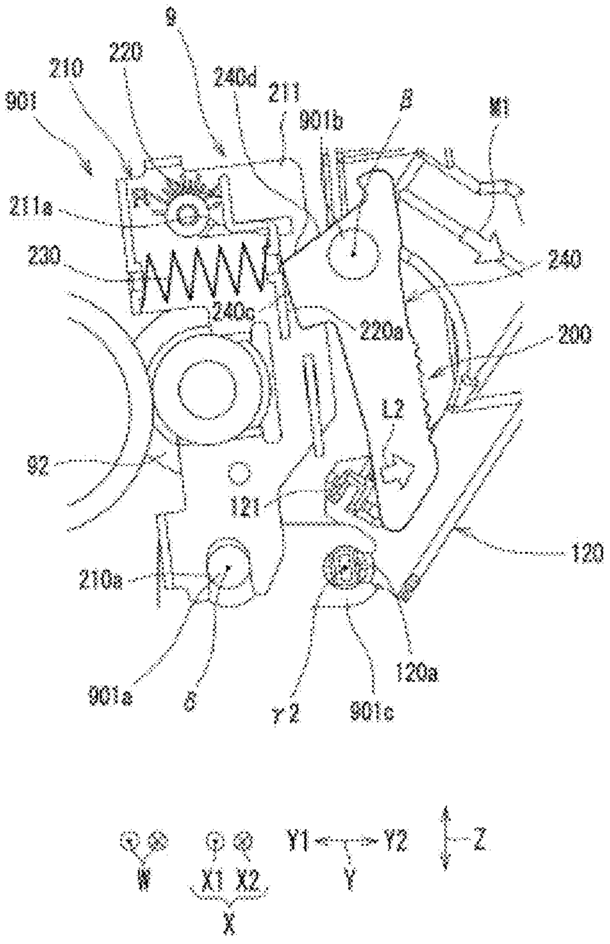
FIG. 21 is a sectional view illustrating a third opening process of opening the second access member.
Figure 22:
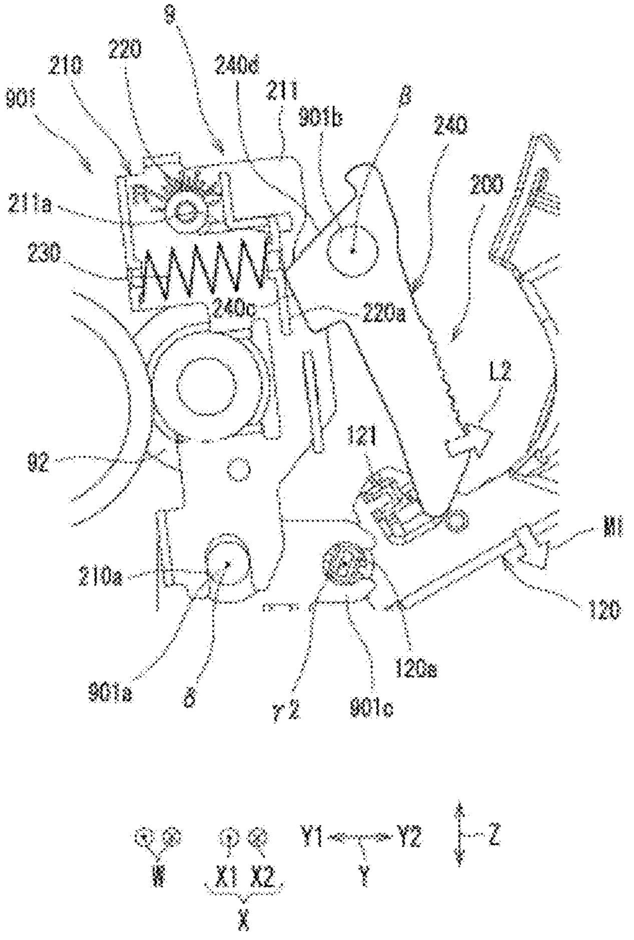
FIG. 22 is a sectional view illustrating a second opening process of opening the second access member.

When the second access member 120 is turned in the opening direction N1 from the closed state in the closing direction N2 (see FIG. 19) (see FIG. 20) when the first access member 110 is open in the opening direction M1, the contact parts 121, 121 in the second access member 120 make contact with the switching members 240, 240, thereby activating the switching members 240, 240 (see FIGS. 21 and 22). At this time, the switching members 240, 240 turn from the pressing side to the pressing release side of the pressing member 92 (in the drawing, an arrow L2 direction), the first contacted surface 240*c* in contact with the pressing surface 220*a* of the pressing member 220 separates from the pressing surface 220*a*, and the second contacted surface 240*d* approaches the pressing surface 220*a*.

When the second access member 120 is further turned in the opening direction N1, the switching members 240, 240 go beyond the top dead center in the process of movement from the first contacted surface 240*c* to the second contacted surface 240*d* (see FIG. 23), the second contacted surface 240*d* makes contact with the pressing surface 220*a* of the pressing member 220, and the contact of the second contacted surface 240*d* with the pressing surface 220*a* is maintained.

In this manner, the image forming device 100 can set the pressing member 92 from the pressing state to the pressure-released state by means of the switching members 240, 240 through the opening operation of the second access member 120 by the operator.

Specifically, the first access member 110 is used for the switching from the pressure-released state to the pressing state, and the second access member 120 is used for the switching from the pressing state to the pressure-released state. In this manner, unlike in the known art, the switching from the pressing state to the pressure-released state and the switching from the pressure-released state to the pressing state are not performed with one access member, and it is thus possible to avoid complication in the configurations of the switching members 240, 240, the first access member 110, and the second access member 120 for the switching. Accordingly, the switching from the pressure-released state to the pressing state and the switching from the pressing state to the pressure-released state of the pressing member 92 with respect to the fixing member 91 can be easily performed without complicating the configuration of the fixing device 9.

First Embodiment

In the present embodiment, the first access member 110 is provided with a first activator (in this example, the sliding contact portion 111) (see FIG. 11) that activates the switching members 240, 240 when the first access member 110 is being closed. In this manner, the pressing member (92) can be easily set from the pressure-released state to the pressing state.

Specifically, the sliding contact portion 111 activates the switching members 240, 240 by making sliding contact with the switching members 240, 240 when the first access member 110 is being closed.

With this configuration, the pressing member (92) can be reliably set from the pressure-released state to the pressing state even with a simple configuration of bringing the sliding contact portions 111, 111 in the first access member 110 into sliding contact with the switching members 240, 240.

In this example, in the lever 240*b* of the switching members 240, 240, the second access member 120 side is tilted at an obtuse angle at a bent portion 240*e*, and an inclined surface 240*f* and a side surface 240*g* are continuously connected with the bent portion 240*e* therebetween. The inclined surface 240*f* is formed along the direction that intersects the longitudinal direction of the lever 240*b*. The side surface 240*g* is formed along both the longitudinal direction of the lever 240*b* and the rotation axis direction W, and continuously connected to the inclined surface 240*f*. The sliding contact portions 111, 111 include a curved surface 111*a*. The curved surface 111*a* is formed in a recessed curved shape such that it sequentially makes sliding contact with the bent portion 240*e* and the inclined surface 240*f* of the switching member 240 when the first access member 110 is closed in the closing direction N2.

Second Embodiment

In the present embodiment, the second access member 120 is provided with a second activator (in this example, a contact part 121) (see FIG. 4) that activates the switching members 240, 240 when the second access member 120 is being opened.

Specifically, the contact part 121 activates the switching members 240, 240 by making contact with the switching members 240, 240 when the second access member 120 is being opened.

With this configuration, the pressing member (92) can be reliably set from the pressing state to the pressure-released state even with a simple configuration of bringing the second activator (121, 121) in the second access member 120 into contact with the switching members 240, 240.

In this example, the contact parts 121, 121 protrude outward from the end portions of the second access member 120 in the second turning axis 2 such that the switching member 240 is turned from the pressing side to the pressing release side of the pressing member 92 (L2 direction) by making contact with an inner surface 240*b*1 (see FIG. 4) of the lever 240*b* of the switching member 240 when the second access member 120 is being opened in the opening direction M1.

Third Embodiment

Incidentally, in a case where the second activator (121) is closer to the switching turning axis β side than the second turning axis γ2 side when the second access member 120 is closed, the force of the operator to open and close the second access member 120 is likely to be large. In addition, the turning angle of the switching members 240, 240 is likely to be large, which may cause the switching members 240, 240 to interfere with the operator when clearing a jam of the sheet P (unjamming) in the fixing device 9.

In view of this, in the present embodiment, when the second access member 120 is closed as illustrated in FIG. 4, the second activator (121, 121) is closer to the second turning axis γ2 side than the switching turning axis β side.

With this configuration, the force of the operator to open and close the second access member 120 for opening and closing the second access member 120 can be suppressed. In addition, the turning angle of the switching members 240, 240 can be reduced as much as possible, which makes the switching members 240, 240 less interfering with the operator when unjamming the sheet P in the fixing device 9. This is particularly significant in a case where a distance d3 between the second activator (121, 121) and the second turning axis γ2 is smaller than a distance d4 between the second activator (121, 121) and an outer surface 120*b* of the second access member 120 (d3<d4).

Specifically, when the second access member 120 is closed, the lever 240*b* of the switching members 240, 240 is located between the second activator (121, 121) and the outer surface 120*b* of the second access member 120. The second activator (121, 121) is closer to a tip end portion 241 side of the lever 240*b* of the switching members 240, 240 than the switching turning axis β side. The tip end portion 241 of the lever 240*b* of the switching members 240, 240 is located between the second activator (121, 121) and the second turning axis γ2 in the longitudinal direction of the lever 240*b*. The second turning axis γ2 of the second access member 120 is located on the side opposite to the switching turning axis β of the switching members 240, 240 with the fixing nip portion FN therebetween in the longitudinal direction of the lever 240*b*.

Fifth Embodiment

Figure 23:
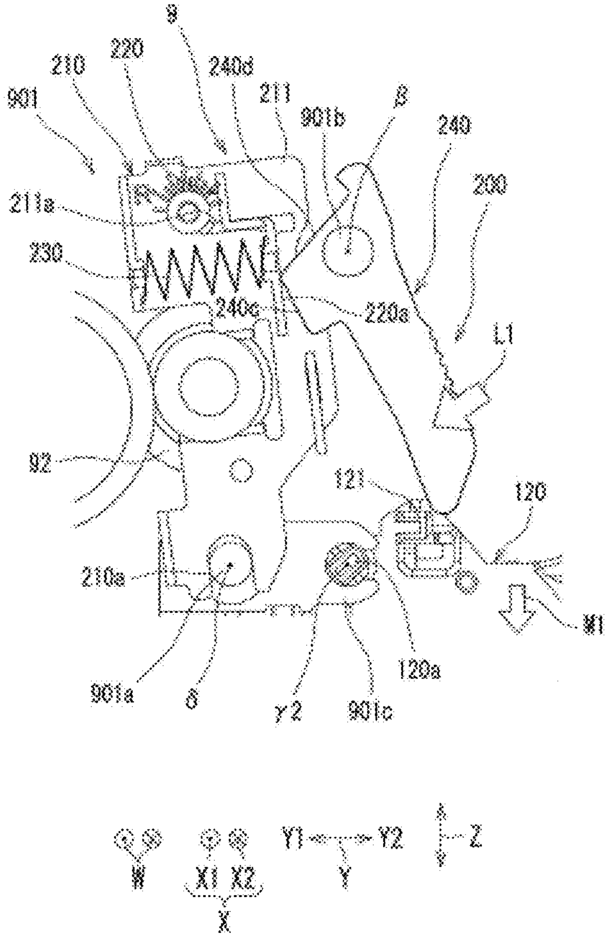
FIG. 23 is a sectional view illustrating a fifth opening process of opening the second access member.

In the present embodiment, as viewed from the rotation axis direction W of the fixing member 91, the switching members 240, 240 and the second access member 120 overlap when the second access member 120 is closed (see FIG. 4), but do not overlap when the second access member 120 is fully opened (see FIG. 23).

With this configuration, the fixing device 9 can be minimized with the switching members 240, 240 and the second access member 120 overlapping as viewed from the rotation axis direction W when the second access member 120 is closed. In addition, since they do not overlap when the second access member 120 is fully opened, the fully opened angle of the second access member 120 can be increased with respect to the attitude angle of the state where the second access member 120 is closed, and accordingly the operator can easily perform unjamming of the sheet P in the fixing device 9.

Sixth Embodiment

In the present embodiment, in the mutual transition process between the pressing state and the pressure-released state, the turning directions of the switching members 240, 240 and the second access member 120 are different from each other.

With this configuration, since the turning directions of the switching members 240, 240 and the second access member 120 are different from each other in the mutual transition process between the pressing state and the pressure-released state, the turning angle of the switching members 240, 240 can be reduced as much as possible when the second access member 120 activates the switching members 240, 240.

Seventh Embodiment

If the switching members 240, 240 can be operated to the pressing state when the second access member 120 is open, the pressing member 92 is set to the pressing state when the operator operates the switching members 240, 240 to the pressing state when the second access member 120 is open. In this case, the pressing member 92 is set to the pressing state even when the second access member 120 is open, and as a result the operator cannot reliably perform unjamming of the sheet P in the fixing device 9.

In view of this, in the present embodiment, operation of the switching members 240, 240 to the pressing state in the state where the second access member 120 is open is restricted. In this example, even when the switching members 240, 240 are operated to the pressing state in the state where the second access member 120 is opened, the tip end portion of the switching members 240, 240 makes contact with the contact parts 121, 121 in the second access member 120 (see FIGS. 22 and 23). Here, "the second access member 120 is open" means an opened state (including fully opened state) except for a state where the second access member 120 is closed.

With this configuration, the operation of setting the switching members 240, 240 to the pressing state when the second access member 120 is open is restricted (in this example, even when the switching members 240, 240 are operated to the pressing state, the switching members 240, 240 make contact with the contact parts 121, 121 in the second access member 120 such that the contact parts 121, 121 are interfering), and thus it is possible to avoid a situation where the pressing member 92 is set to the pressing state when the operator operates the switching members 240, 240 to the pressing state when the second access member 120 is open. In this manner, the operator can reliably perform unjamming of the sheet P in the fixing device 9.

Eighth Embodiment

In the present embodiment, the second access member 120 is a conveyance guide member that guides the sheet P conveyed at the outer surface. The first access member 110 is an exterior cover member of the image forming device body 101 that forms the conveyance path of the sheet P (in this example, a part of the sheet inversion conveyance path 17) (see FIG. 1) together with the conveyance guide member, which is the second access member 120.

With this configuration, the first access member 110 and the second access member 120 can serve also as a conveyance path of the sheet P, and the first access member 110 can serve also as an exterior cover.

The present disclosure is not limited to the embodiments described above, and may be implemented in various other forms. Therefore, such embodiments are merely illustrative in all respects and should not be construed as limiting. The scope of the present disclosure is defined by the claims and is not restricted by the body of the specification. Furthermore, modifications and alterations that fall within the equivalent scope of the claims are all encompassed within the scope of the present disclosure.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming device comprising:

a fixing device that switches between a pressing state and a pressure-released state of a pressing member with respect to a rotatable fixing member by means of a switching member; and a first access member that covers the fixing device when the first access member is in a closed state, and exposes the fixing device when the first access member is in an opened state, wherein the fixing device includes a second access member that covers a component in a fixing device body when the second access member is in a closed state, and covers the component when the second access member is in an opened state, when closed from the opened state, the first access member activates the switching member to set the pressing member to the pressing state from the pressure-released state, and when opened from the closed state, the second access member activates the switching member to set the pressing member to the pressure-released state from the pressing state.

2. The image forming device according to claim 1, wherein the first access member is provided with a first activator that activates the switching member when the first access member is closed.

3. The image forming device according to claim 1, wherein the second access member is provided with a second activator that activates the switching member when the second access member is opened.

4. The image forming device according to claim 1, wherein the switching member turns about a switching turning axis extending along a rotation axis of the fixing member, the second access member is openable and closable about a second turning axis extending along the rotation axis, the second access member is provided with a second activator that activates the switching member when the second access member is opened, and when the second access member is closed, the second activator is closer to the second turning axis side than the switching turning axis side.

5. The image forming device according to claim 1, wherein as viewed from a rotation axis direction of the fixing member, the switching member and the second access member overlap each other when the second access member is closed, and the switching member and the second access member do not overlap each other when the second access member is fully opened.

6. The image forming device according to claim 1, wherein in a mutual transition process between the pressing state and the pressure-released state, turning directions of the switching member and the second access member are different from each other.

7. The image forming device according to claim 1, wherein when the second access member is open, an operation of setting the switching member to the pressing state is restricted.

8. The image forming device according to claim 1, wherein the second access member is a conveyance guide member that guides a sheet conveyed at an outer surface, and the first access member is an exterior cover member of an image forming device body that forms a conveyance path of the sheet together with the conveyance guide member that is the second access member.

* * * * *